US012752735B2

(12) United States Patent
Jeon

(10) Patent No.: US 12,752,735 B2
(45) Date of Patent: Oct. 6, 2026

(54) SEAT BELT REMINDER INSPECTION DEVICE

(71) Applicant: BRILS Co., Ltd., Incheon (KR)

(72) Inventor: Jin Jeon, Incheon (KR)

(73) Assignee: BRILS Co., Ltd., Incheon (KR)

( * ) Notice: Subject to any disclaimer, the term of this patent is extended or adjusted under 35 U.S.C. 154(b) by 252 days.

(21) Appl. No.: 18/775,858

(22) Filed: Jul. 17, 2024

(65) Prior Publication Data

US 2025/0100504 A1 Mar. 27, 2025

(30) Foreign Application Priority Data

Sep. 25, 2023 (KR) ........................ 10-2023-0128020

(51) Int. Cl.
*B60R 22/48* (2006.01)
*B62D 65/00* (2006.01)

(52) U.S. Cl.
CPC ............ *B60R 22/48* (2013.01); *B62D 65/005* (2013.01); *B60R 2022/4866* (2013.01)

(58) Field of Classification Search
CPC ............ B60R 22/48; B60R 2022/4866; B62D 65/005
See application file for complete search history.

(56) References Cited

FOREIGN PATENT DOCUMENTS

| | | | | | |
|---|---|---|---|---|---|
| CN | 103386949 | A | * | 11/2013 | B60R 22/48 |
| DE | 102004041402 | A1 | * | 4/2005 | B60R 22/48 |
| JP | 2005145362 | A | * | 6/2005 | |
| KR | 10-1998-0038084 | A | | 8/1998 | |
| KR | 19980031402 | U | * | 8/1998 | B60R 22/48 |
| KR | 10-0228122 | B1 | | 11/1999 | |
| KR | 100781825 | B1 | * | 12/2007 | G01N 33/0083 |
| KR | 101253733 | B1 | * | 4/2013 | G01M 99/007 |
| KR | 102158073 | B1 | * | 9/2020 | B62D 65/005 |

* cited by examiner

*Primary Examiner* — Francis C Gray
(74) *Attorney, Agent, or Firm* — Bridgeway IP Law Group, PLLC; Jihun Kim

(57) ABSTRACT

Embodiments relate to a seat belt reminder inspection device, which is configured to inspect whether a seat belt reminder is normally operated by pressing a car seat with B-FORM through servo control and implementing a simulation of an actual passenger sitting on the car seat and pressing the car seat. The device includes a main frame made of a structural steel pipe, a B-FORM assembly seated with a preset load on a seat, which is an inspection target that is continuously moved through a conveyor system, a moving unit connecting the B-FORM assembly to the main frame, and seating the B-FORM assembly on the seat with a preset load when the seat is moved to an inspection position, and a system control panel inspecting whether the reminder of a seat belt installed on the seat is normally output when the B-FORM assembly is seated on the seat.

10 Claims, 9 Drawing Sheets

SEAT BELT REMINDER INSPECTION DEVICE

CROSS-REFERENCE TO RELATED APPLICATIONS

This application claims the priority of Korean Patent Application No. 10-2023-0128020 filed on Sep. 25, 2023, in the Korean Intellectual Property Office, the disclosure of which is incorporated herein by reference.

TECHNICAL FIELD

The present disclosure relates to a seat belt reminder inspection device, and more specifically, to a seat belt reminder inspection device, which is configured to inspect whether a seat belt reminder is normally operated by pressing a car seat with B-FORM through servo control to implement a simulation of an actual passenger sitting on the car seat and pressing the car seat.

BACKGROUND

Generally, the surface material of a car seat deteriorates in appearance due to wear, sagging, and wrinkles caused by repetitive sitting actions of passengers over a long period and repeated loading from vibrations occurring while driving on roads with poor surface conditions. Furthermore, a shock absorbing member, such as polyurethane foam stored inside the surface material, may be pressed downward due to the same reasons, so that it may not fully perform the function.

Therefore, in manufacturing the car seat, efforts are made to create a higher-quality seat by conducting a durability test on an actual seat under the same usage conditions. The test measures a point at which the appearance quality of the surface material deteriorates and a point at which the cushioning ability of the shock absorbing member decreases.

However, the initially known seat durability testing technique has limitations, such as a workload involved in having a human repeatedly sit on the seat. Moreover, this is problematic in that it takes a long time to obtain test results, leading to both tangible and intangible losses, and the test results are not uniform, reducing the reliability of the test results and significantly lowering the overall efficiency of a seat testing process.

The description provided above as a related art of the present disclosure is for helping understand the background of the present disclosure and should not be construed as being included in the related art known by those skilled in the art.

PRIOR ART DOCUMENT

Patent Document (Patent Document 1) Korean Patent No. 10-0228122 (1999.11.01.)
(Patent Document 2) Korean Patent Publication No. 10-1998-0038084 (1998.08.05.)

SUMMARY

In view of the above, the present disclosure provides a seat belt reminder inspection device, which applies a servo and a load cell to precisely control a position and monitor a pressurized load in real time for accurate inspection, and presses a car seat with B-FORM to implement a simulation of an actual passenger sitting on the car seat and pressing the car seat, thereby enabling a user to inspect whether a seat belt reminder is normally operated.

Technical objects to be achieved by the present disclosure are not limited to those described above, and other technical objects that are not mentioned above may also be clearly understood from the descriptions given below by those skilled in the art to which the present disclosure belongs.

The present disclosure provides a seat belt reminder inspection device, the device including a main frame made of a structural steel pipe, a B-FORM assembly seated with a preset load on a seat, which is an inspection target that is continuously moved through a conveyor system, a moving unit connecting the B-FORM assembly to the main frame, and seating the B-FORM assembly on the seat with a preset load when the seat is moved to an inspection position, and a system control panel inspecting whether the reminder of a seat belt installed on the seat is normally output when the B-FORM assembly is seated on the seat.

In an embodiment, the moving unit may include a Y-axis assembly installed on an upper end of the main frame, and moving the B-FORM assembly in a Y-axis direction by the drive control of the system control panel, an X-axis assembly slidably connected to an upper end of the Y-axis assembly and moving the B-FORM assembly in an X-axis direction by the drive control of the system control panel, and a Z-axis assembly slidably connected to the X-axis assembly and moving the B-FORM assembly in a Z-axis direction by the drive control of the system control panel In an embodiment, the B-FORM assembly may include a lifting slider engaging with a Z-axis assembly to enable sliding movement in a vertical direction, a B-FORM formed in a shape of buttocks, installed on a lower end of the lifting slider, and moved up and down by the lifting slider, and a load cell installed between the lifting slider and the B-FORM, measuring a load transmitted to the B-FORM and then transmitting a load measurement value to the system control panel when the B-FORM is seated on the seat.

In an embodiment, the system control panel may store a seating load of the B-FORM that is seated on the seat in a database for each manufacturer of the seat.

In an embodiment, the seat belt reminder inspection device may further include a vision inspection device reading a shape of the seat through vision inspection and then transmitting it to the system control panel, and an RFID reader device scanning an RFID tag attached to the seat while including information on the seat, retrieving information on the seat from the RFID tag, and then transmitting it to the system control panel.

In an embodiment, the B-FORM assembly may further include four individual pressing parts inserted into the B-FORM in response to positions of four seat belt reminder sensors installed on the seat, and individually driven when the B-FORM is seated on the seat to individually press at least one of the four seat belt reminder sensors.

In an embodiment, the individual pressing part may include a fluid supply tank supplying fluid and recovering the supplied fluid, a tube housing installed below the fluid supply tank to receive fluid from the fluid supply tank or deliver the supplied fluid back to the fluid supply tank, and an expansion tube formed of an elastic material that may expand or contract, installed to seal a lower side of the tube housing, pressurizing the seat belt reminder sensor while expanding as fluid is supplied to the tube housing, and contracted as fluid returns from the tube housing to the fluid supply tank.

In an embodiment, the B-FORM may include a base frame installed on a lower end of the lifting slider, a side form made of a material that is expandable or contractible and installed on each of opposite sides of the base frame, an end plate installed on each end of the side form, an actuator installed on each of opposite sides of the base frame to support the end plate, and expanded or contracted to move the end plate close to or away from the base frame, thereby causing the side form to expand or contract, a pocket support wing formed in a shape of a flat plate to be seated in a wing seating groove that is formed in a lower end of each of the opposite sides of the base frame, with each end thereof exposed from the wing seating groove being installed on the end plate, the pocket support wing being also moved as the end plate moves, a plurality of first air pockets installed in a row along the lower side of the base frame, and a plurality of second air pockets installed in a row along the lower side of the pocket support wing.

In an embodiment, the system control panel may adjust a width of the side form by driving the actuator in response to a manufacturer of the seat, which is an inspection target.

In an embodiment, the system control panel may individually expand or contract each of the first air pocket and the second air pocket in response to the manufacturer of the seat, which is an inspection target, thus varying a bottom surface curvature of the B-FORM.

Advantageous Effects

According to an aspect of the present disclosure, a servo and a load cell are applied to precisely control a position and monitor a pressurized load in real time for accurate inspection, and a car seat is pressed with B-FORM to implement a simulation of an actual passenger sitting on the car seat and pressing the car seat, thereby enabling a user to effectively inspect whether a seat belt reminder is normally operated.

Effects of the present disclosure are not limited to the above-mentioned effects, and various effects will be clearly understood by those skilled in the art from the following claims.

DETAILED DESCRIPTION

Figure 1:
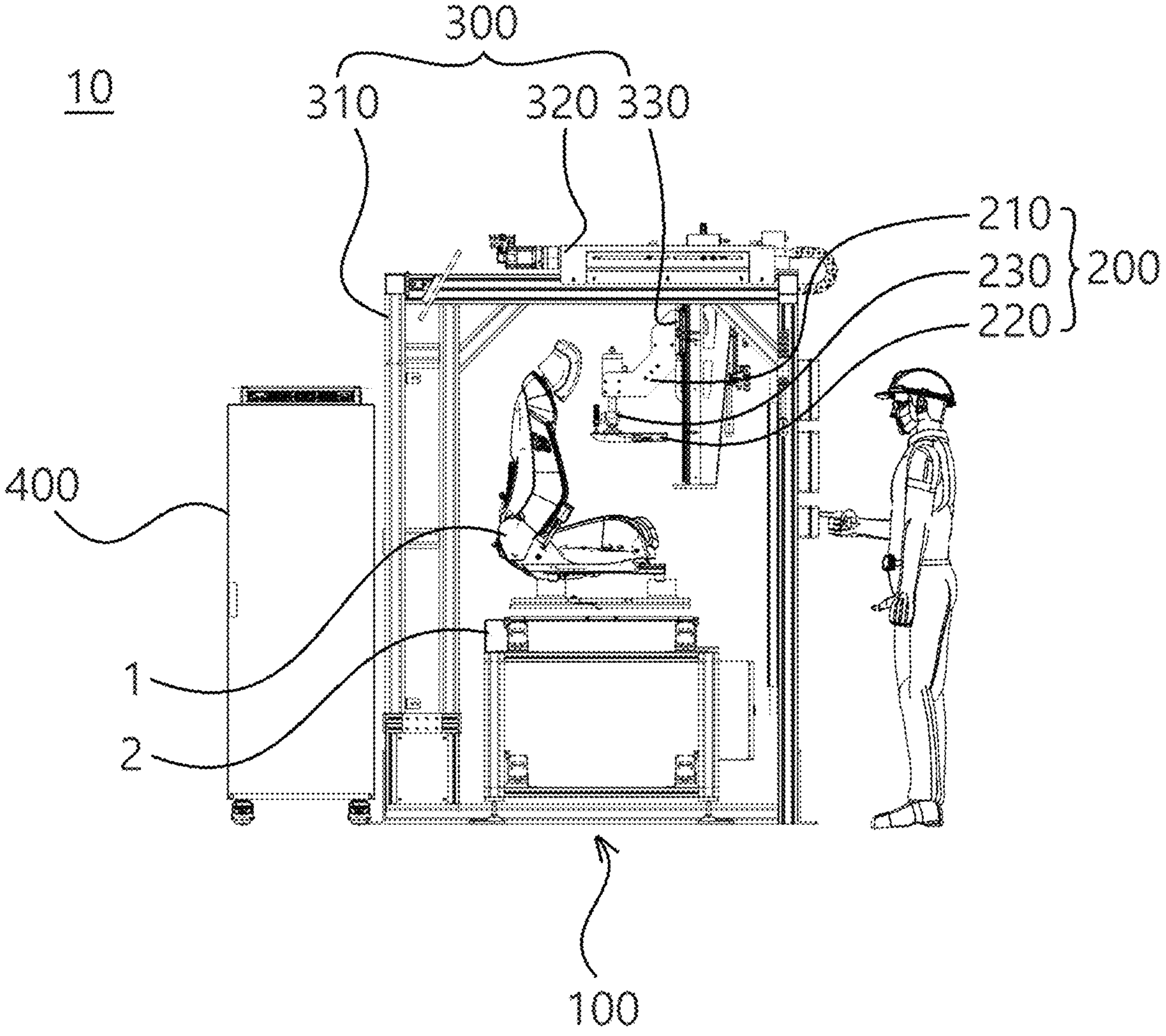
FIGS. 1 to 3 are diagrams showing the schematic configuration of a seat belt reminder inspection device according to an embodiment of the present disclosure.

The present disclosure will be described below in detail with reference to the accompanying drawings, which show by way of example specific embodiments in which the present disclosure may be practiced. These embodiments are described in detail to enable those skilled in the art to practice the present disclosure. It should be understood that various embodiments of the present disclosure are different from one another but are not necessarily mutually exclusive. For example, specific shapes, structures and characteristics described herein may be implemented in various ways without departing from the spirit and scope of the present disclosure. Further, it should be understood that the position or arrangement of individual components within each disclosed embodiment may be changed without departing from the spirit and scope of the present disclosure. Accordingly, the detailed description set forth below is not intended to be taken in a limiting sense, and the scope of the present disclosure is defined only by the appended claims and equivalents thereof. Like reference numerals refer to like parts throughout various figures and embodiments of the present disclosure.

Hereinafter, preferred embodiments of the present disclosure will be described in detail with reference to the accompanying drawings.

Figure 2:
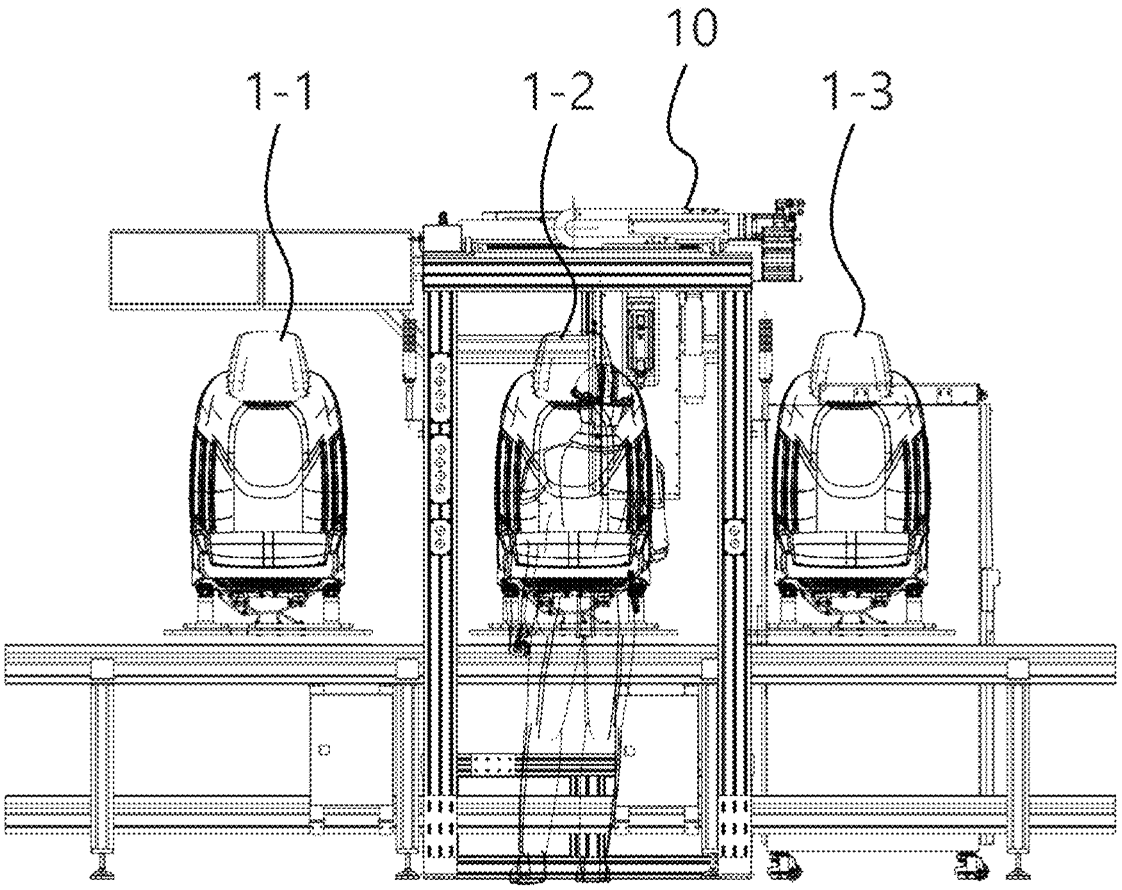
Figure 3:
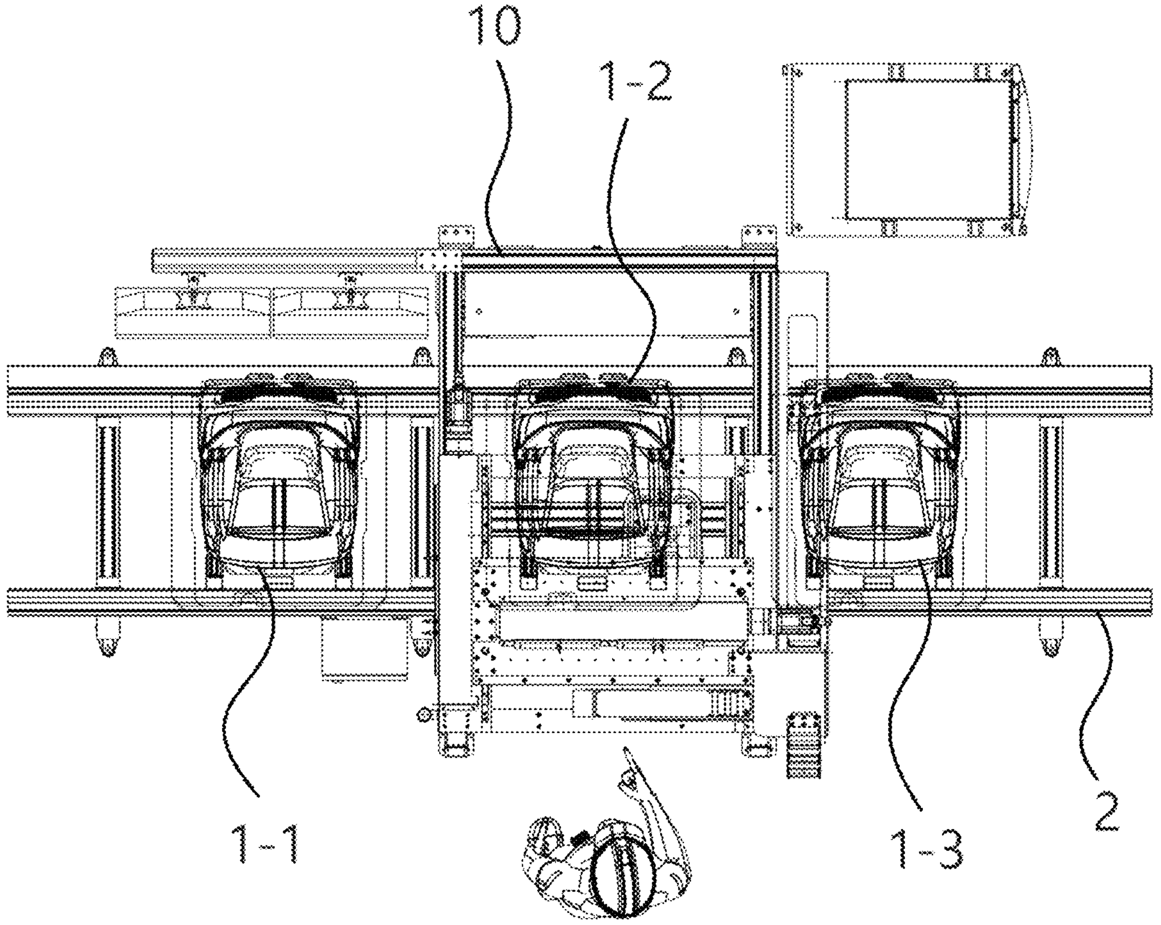

FIGS. 1 to 3 are diagrams showing the schematic configuration of a seat belt reminder inspection device according to an embodiment of the present disclosure.

Referring to FIGS. 1 to 3, the seat belt reminder inspection device 10 according to an embodiment of the present disclosure includes a main frame 100, a B-FORM assembly 200, a moving unit 300, and a system control panel 400.

The main frame 100 is made of a structural steel pipe to define the external appearance of the seat belt reminder inspection device 10 according to an embodiment of the present disclosure, and components including the B-FORM assembly 200, the moving unit 300, and the system control panel 400 are installed therein.

The B-FORM assembly 200 is seated with a preset load (e.g., 30 to 100 kg corresponding to the weight of a passenger) by the moving unit 300 on the seat 1, which is an inspection target that is continuously moved through a conveyor system 2.

In an embodiment, the B-FORM assembly 200 may include a lifting slider 210, a B-FORM 220, and a load cell 230.

The lifting slider 210 engages with a Z-axis assembly 330 to enable sliding movement in a vertical direction, and moves the B-FORM 220 in the vertical direction.

The B-FORM 220 is formed in the shape of the buttocks, is installed on a lower end of the lifting slider 210, and is moved up and down by the lifting slider 210.

The load cell 230 is installed between the lifting slider 210 and the B-FORM 220. When the B-FORM 220 is seated on the seat 1, the load cell measures a load transmitted to the B-FORM 220 and then transmits a load measurement value to the system control panel 400.

The moving unit 300 connects the B-FORM assembly 200 to the main frame 100, and seats the B-FORM assembly 200 on the seat 1 with a preset load (e.g., 30 to 100 kg corresponding to the weight of a passenger) when the seat 1 is moved to an inspection position by the B-FORM assembly 200.

In an embodiment, the moving unit 300 may include a Y-axis assembly 310, an X-axis assembly 320, and a Z-axis assembly 330.

The Y-axis assembly 310 is installed on the upper end of the main frame 100, and moves the B-FORM assembly 200 in a Y-axis direction by the drive control of the system control panel 400.

The X-axis assembly 320 is slidably connected to the upper end of the Y-axis assembly 310, and moves the B-FORM assembly 200 in an X-axis direction by the drive control of the system control panel 400.

The Z-axis assembly 330 is slidably connected to the X-axis assembly 320, and moves the B-FORM assembly 200 in a Z-axis direction by the drive control of the system control panel 400.

The system control panel 400 controls the driving of equipment such as the B-FORM assembly 200 and the moving unit 300, and inspects whether the reminder of a seat belt installed on the seat 1 is normally output when the B-FORM assembly 200 is seated on the seat 1.

In an embodiment, the system control panel 400 may store the seating load of the B-FORM 220 that is seated on the seat 1 in a database for each manufacturer of the seat 1.

The seat belt reminder inspection device 10 according to an embodiment of the present disclosure having the above-described configuration may further include a vision inspection device (not shown in the drawing for convenience of description) and an RFID reader device (not shown in the drawing for convenience of description).

The vision inspection device reads the shape of the seat 1 through vision inspection and then transmits it to the system control panel 400.

The RFID reader device scans an RFID tag attached to the seat 1 while including information on the seat 1, retrieves the information on the seat 1 from the RFID tag, and then transmits it to the system control panel 400.

In an embodiment, the system control panel 400 may read the shape of the seat 1, which is an inspection target, using various pieces of data received from the vision inspection device and the RFID reader device, and perform the inspection with a load appropriate for the shape.

The B-FORM assembly 200 having the above-described configuration may further include four individual pressing parts 240-1 to 240-4.

Figure 4:
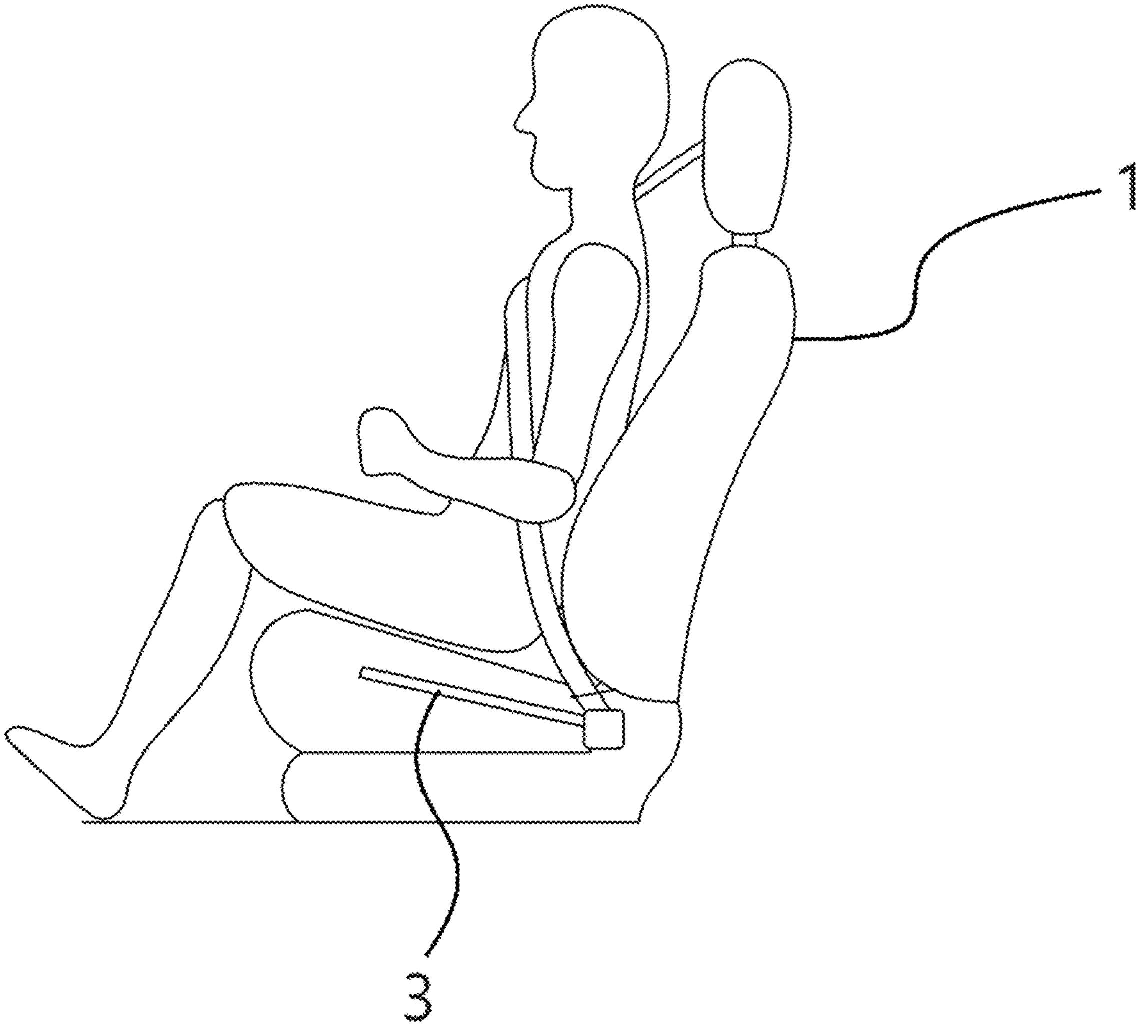
FIG. 4 is a diagram showing a seat belt reminder sensor, which is an inspection target, according to the present disclosure
Figure 5:
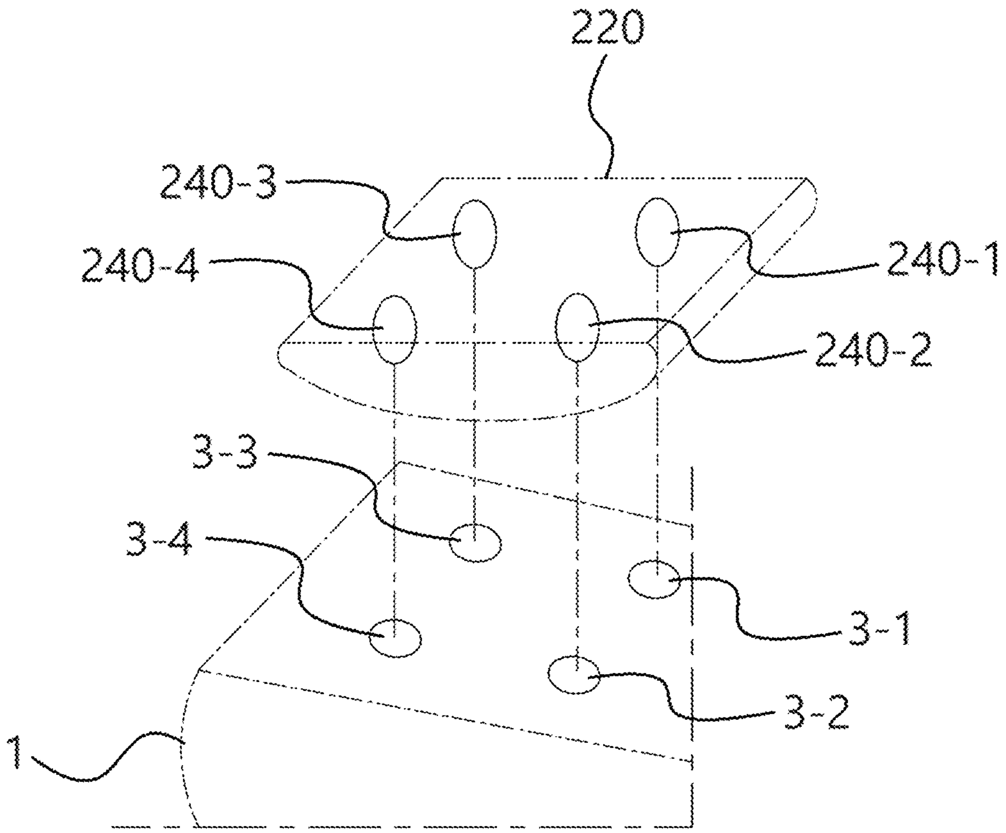
FIG. 5 is a diagram showing a B-FORM assembly of FIG. 1.

Generally, as shown in FIGS. 4 and 5, four seat belt reminder sensors 3-1 to 3-4 are arranged in a quadrangular arrangement on the car seat. When a load is detected by at least two diagonally arranged sensors among the four seat belt reminder sensors 3-1 to 3-4, a reminder is triggered Defect inspection may be performed by checking whether a reminder is triggered (indicating a defect), when a load is applied to sensors (one sensor, two horizontally arranged sensors, or two vertically arranged sensors, etc.) other than the two diagonally arranged seat belt reminder sensors 3-1 and 3-4 or 3-2 and 3-3.

The four individual pressing parts 240-1 to 240-4 are inserted into the B-FORM 220 in response to the positions of the four seat belt reminder sensors 3-1 to 3-4 installed on the seat 1. When the B-FORM 220 is seated on the seat 1, it is individually driven to individually press at least one of the four seat belt reminder sensors 3-1 to 3-4.

The seat belt reminder inspection device 10 according to an embodiment of the present disclosure having the above-described configuration is inspection equipment that detects a weight by installing a WEIGHT device to check the presence or absence of a passenger and provides a seat belt reminder. Here, a servo and a load cell are applied to precisely control a position and monitor a pressurized load in real time for accurate inspection, and a car seat is pressed with B-FORM to implement a simulation of an actual passenger sitting on the car seat and pressing the car seat, thereby enabling a user to inspect whether a seat belt reminder is normally operated.

Figure 6:
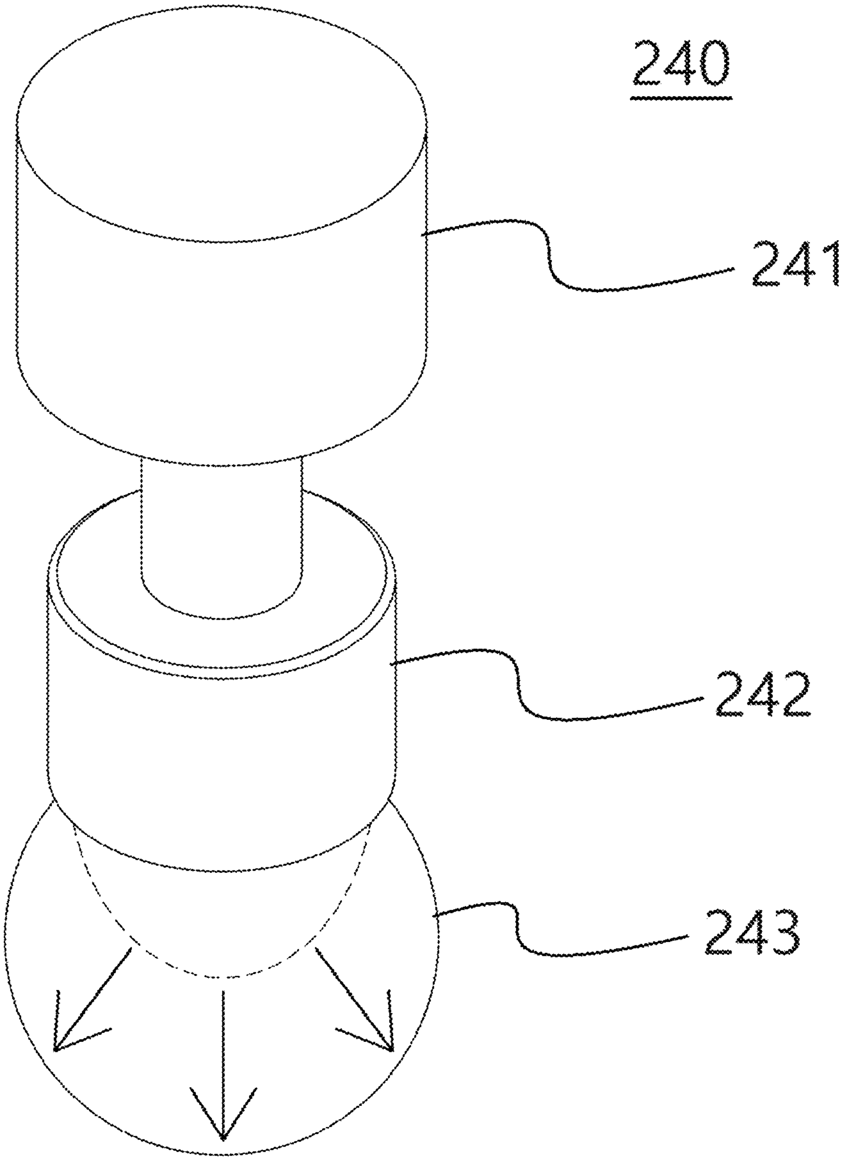
FIG. 6 is a diagram showing an individual pressing part of FIG. 5.

FIG. 6 is a diagram showing the individual pressing part of FIG. 5.

Referring to FIG. 6, the individual pressing part 240 includes a fluid supply tank 241, a tube housing 242, and an expansion tube 243.

The fluid supply tank 241 supplies fluid, which is a fluid substance such as water, oil, or air, to the tube housing 242 and the expansion tube 243, and recovers the fluid supplied to the tube housing 242 and the expansion tube 243.

The tube housing 242 is installed below the fluid supply tank 241 to receive fluid from the fluid supply tank 241 or deliver the supplied fluid back to the fluid supply tank 241.

The expansion tube 243 is formed of an elastic material that may expand or contract, such as rubber, and is installed to seal the lower side of the tube housing 242. As fluid is supplied to the tube housing 242, the expansion tube expands and pressurizes a belt reminder sensor of the seat 1. As fluid returns from the tube housing 242 to the fluid supply tank 241, the expansion tube contracts.

Each individual pressing part 240 having the above-described configuration may be individually expanded or contracted, and may precisely control the volume of expansion or contraction. By pressing the seat belt reminder sensor 3 installed on the B-FORM, it may implement a simulation of an actual passenger sitting on the car seat and pressing the car seat, and precisely determine whether the seat belt reminder sensor 3 is defective.

Figure 7:
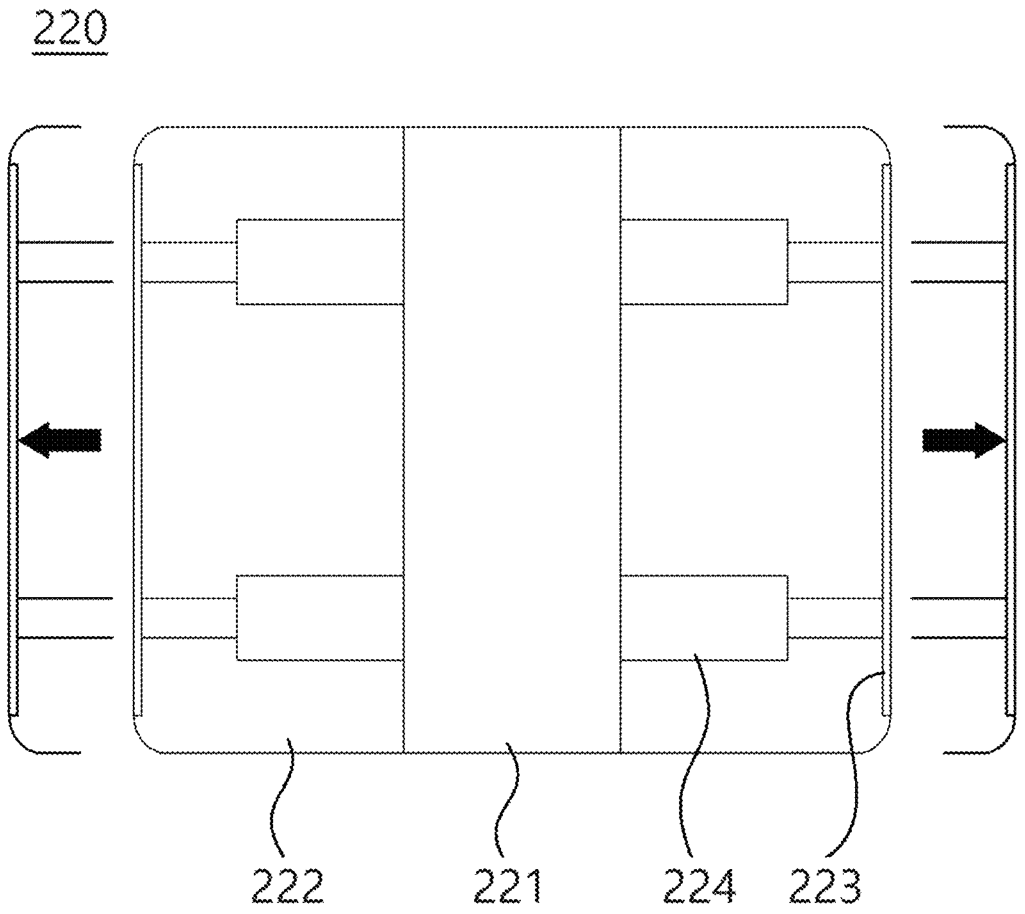
FIGS. 7 to 9 are diagrams showing an embodiment of the B-FORM of FIG. 1.
Figure 8:
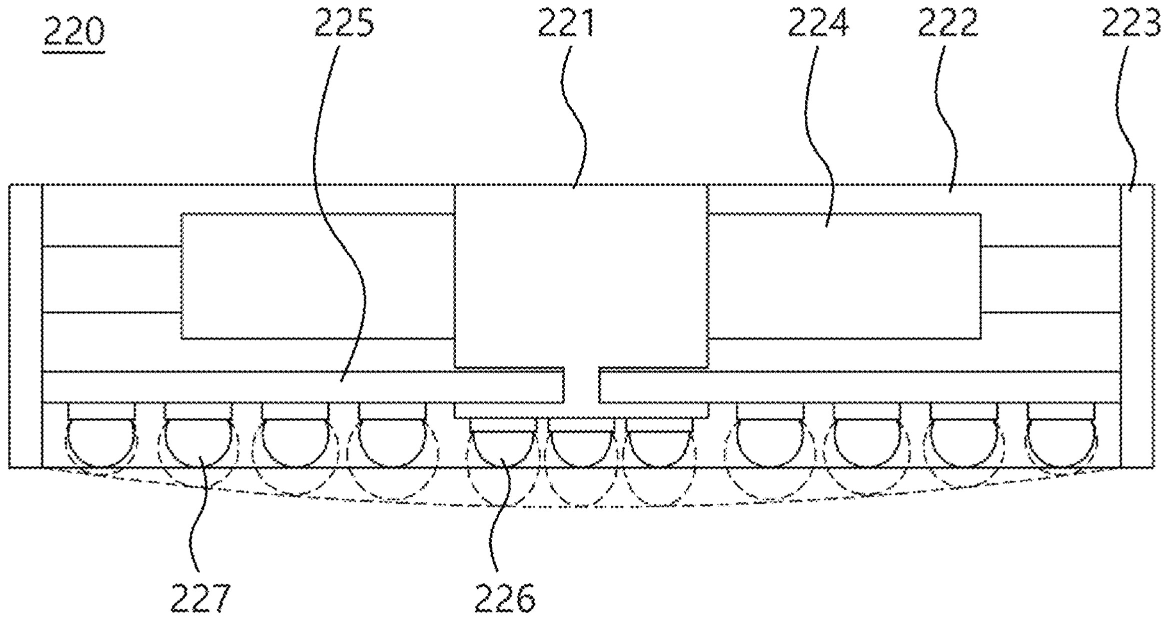
Figure 9:
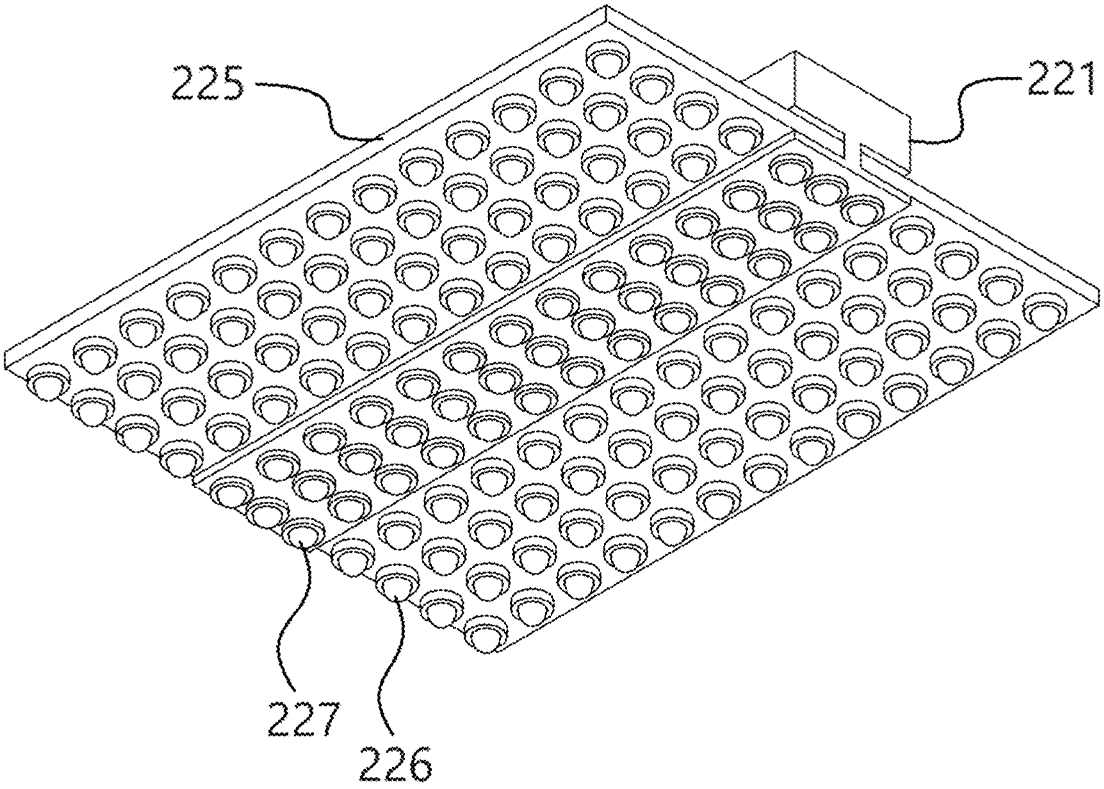

FIGS. 7 to 9 are diagrams showing an embodiment of the B-FORM of FIG. 1.

Referring to FIGS. 7 to 9, the B-FORM 220 according to an embodiment includes a base frame 221, a side form 222, an end plate 223, an actuator 224, a pocket support wing 225, a plurality of first air pockets 226, and a plurality of second air pockets 227.

The base frame 221 is installed on the lower end of the lifting slider 210 to move up and down in a vertical direction.

The side form 222 is made of a material that is expandable or contractible (e.g., Styrofoam or sponge, etc.), and is installed on each of opposite sides of the base frame 221. The shape of the side form is supported by the end plate 223, the actuator 224, and the pocket support wing 225.

The end plate 223 is installed on each end of the side form 222, and moves away from or approaches the base frame 221 by the actuator 224 to change the shape of the side form 222 in response to the size of a passenger's buttocks.

The actuator 224 is installed on each of opposite sides of the base frame 221 to support the end plate 223, and is expanded or contracted to move the end plate 223 close to or away from the base frame 221, thereby causing the side form 222 to expand or contract.

The pocket support wing 225 is formed in the shape of a flat plate to be seated in a wing seating groove that is formed in a lower end of each of the opposite sides of the base frame 221. Each end exposed from the wing seating groove is installed on the end plate 223. As the end plate 223 moves, the pocket support wing is also moved.

The plurality of first air pockets 226 are installed in a row along the lower side of the base frame 221 and are individually expanded or contracted.

The plurality of second air pockets 227 are installed in a row along the lower side of the pocket support wing 225 and are individually expanded or contracted.

Here, the first air pocket 226 and the second air pocket 227 are the same configuration as the individual pressing part 240 described above with reference to FIG. 6 and are capable of expansion and contraction. In order to avoid a duplicated description, the description thereof will be omitted.

In an embodiment, the system control panel 400 may adjust the width of the side form 222 by driving the actuator 224 in response to the manufacturer of the seat 1, which is an inspection target.

In an embodiment, the system control panel 400 may individually expand or contract each of the first air pocket 226 and the second air pocket 227 in response to the manufacturer of the seat 1, which is an inspection target, thus varying the bottom surface curvature of the B-FORM 220.

The B-FORM 220 according to an embodiment having the above-described configuration may use the first air pocket 226 and the second air pocket 227 that are individually expandable and contractible to allow the surface curvature to vary, and may adjust the overall area or width to accommodate the size of a passenger's buttocks, thereby enabling more precise sensor inspection.

The above description is merely exemplary description of the technical scope of the present disclosure, and it will be understood by those skilled in the art that various changes and modifications can be made without departing from original characteristics of the present disclosure. Therefore, the aforementioned embodiments should be understood as illustrative in all respects and not as restrictive. For example, each component described as a single unit may be implemented in a distributed manner, and components described as distributed may also be implemented in a combined form.

The protection scope of the present disclosure is indicated by the scope of the claims described below rather than a detailed description, and all changes or modifications derived from claims and equivalences thereof should be construed as being included in the scope of the present disclosure.

DETAILED DESCRIPTION OF MAIN ELEMENTS

10: seat belt reminder inspection device
100: main frame
200: B-FORM assembly
300: moving unit
400: system control panel

What is claimed is:

1. A seat belt reminder inspection device, the device comprising:

a main frame made of a structural steel pipe;

a B-FORM assembly seated with a preset load on a seat, which is an inspection target that is continuously moved through a conveyor system;

a moving unit connecting the B-FORM assembly to the main frame, and seating the B-FORM assembly on the seat with a preset load when the seat is moved to an inspection position; and a system control panel inspecting whether the reminder of a seat belt installed on the seat is normally output when the B-FORM assembly is seated on the seat.

2. The seat belt reminder inspection device of claim 1, wherein the moving unit comprises:

a Y-axis assembly installed on an upper end of the main frame, and moving the B-FORM assembly in a Y-axis direction by the drive control of the system control panel;

an X-axis assembly slidably connected to an upper end of the Y-axis assembly, and moving the B-FORM assembly in an X-axis direction by the drive control of the system control panel; and a Z-axis assembly slidably connected to the X-axis assembly, and moving the B-FORM assembly in a Z-axis direction by the drive control of the system control panel.

3. The seat belt reminder inspection device of claim 2, wherein the B-FORM assembly comprises:

a lifting slider engaging with a Z-axis assembly to enable sliding movement in a vertical direction;

a B-FORM formed in a shape of buttocks, installed on a lower end of the lifting slider, and moved up and down by the lifting slider; and a load cell installed between the lifting slider and the B-FORM, measuring a load transmitted to the B-FORM and then transmitting a load measurement value to the system control panel when the B-FORM is seated on the seat.

4. The seat belt reminder inspection device of claim 3, wherein the system control panel stores a seating load of the B-FORM that is seated on the seat in a database for each manufacturer of the seat.

5. The seat belt reminder inspection device of claim 1, further comprising:

a vision inspection device reading a shape of the seat through vision inspection and then transmitting it to the system control panel; and an RFID reader device scanning an RFID tag attached to the seat while including information on the seat, retrieving information on the seat from the RFID tag, and then transmitting it to the system control panel.

6. The seat belt reminder inspection device of claim 3, wherein the B-FORM assembly further comprises:

four individual pressing parts inserted into the B-FORM in response to positions of four seat belt reminder sensors installed on the seat, and individually driven when the B-FORM is seated on the seat to individually press at least one of the four seat belt reminder sensors.

7. The seat belt reminder inspection device of claim 6, wherein the individual pressing part comprises:

a fluid supply tank supplying fluid and recovering the supplied fluid;

a tube housing installed below the fluid supply tank to receive fluid from the fluid supply tank or deliver the supplied fluid back to the fluid supply tank; and an expansion tube formed of an elastic material that may expand or contract, installed to seal a lower side of the tube housing, pressurizing the seat belt reminder sensor while expanding as fluid is supplied to the tube housing, and contracted as fluid returns from the tube housing to the fluid supply tank.

8. The seat belt reminder inspection device of claim 3, wherein the B-FORM comprises:

a base frame installed on a lower end of the lifting slider;

a side form made of a material that is expandable or contractible, and installed on each of opposite sides of the base frame;

an end plate installed on each end of the side form;

an actuator installed on each of opposite sides of the base frame to support the end plate, and expanded or contracted to move the end plate close to or away from the base frame, thereby causing the side form to expand or contract;

a pocket support wing formed in a shape of a flat plate to be seated in a wing seating groove that is formed in a lower end of each of the opposite sides of the base frame, with each end thereof exposed from the wing seating groove being installed on the end plate, the pocket support wing being also moved as the end plate moves;

a plurality of first air pockets installed in a row along the lower side of the base frame; and a plurality of second air pockets installed in a row along the lower side of the pocket support wing.

9. The seat belt reminder inspection device of claim 8, wherein the system control panel adjusts a width of the side form by driving the actuator in response to a manufacturer of the seat, which is an inspection target.

10. The seat belt reminder inspection device of claim 8, wherein the system control panel individually expands or contracts each of the first air pocket and the second air pocket in response to the manufacturer of the seat, which is an inspection target, thus varying a bottom surface curvature of the B-FORM.

* * * * *